United States Patent Office 3,417,068
Patented Dec. 17, 1968

---

3,417,068
METHOD OF CURING A NITROSO RUBBER CONTAINING CARBOXYLIC ACID GROUPS WITH CHROMIUM TRIPERFLUOROACETATE OR CHROMIC ACETATE AND PRODUCTS RESULTING THEREFROM
Nicholas Knoll, St. Paul, Minn., assignor to the United States of America as represented by the Secretary of the Army
No Drawing. Filed Dec. 8, 1964, Ser. No. 416,944
10 Claims. (Cl. 260—92.1)

---

ABSTRACT OF THE DISCLOSURE

A polymeric product comprising monomeric units having nitroso groups substituted therein, having carboxylic acid groups along the chain thereof, and having chromium atoms coordinated with the carboxylic acid groups to form Werner-type chromium complexes; and a method of curing a polymer comprising nitroso groups in the main chain thereof and having carboxylic acid groups along the chain thereof comprising reacting the polymer with a Werner-type complex forming chromium salt.

---

The invention described herein, if patented, may be manufactured and used by or for the Government for governmental purposes without the payment to me of any royalty thereon.

This invention relates to curing or vulcanization of polymers containing carboxylic acid groups.

Solid copolymers of fluorine-containing nitrosoalkanes and perfluorinated olefins are known in the prior art. These copolymers are elastomeric or plastic in nature and have many uses particularly in severe environments because the copolymers combine resistance to chemical and solvent attack with low temperature serviceability. The elastomeric copolymers may be vulcanized or cross-linked to yield materials of increased hardness and stiffness. Diamines have been used for this purpose. However, the products cross-linked in this manner have exhibited poor thermal stability and poor chemical resistance. It has, therefore, been desirable to find a method of curing or vulcanizing polymers of this type to make products having good low temperature serviceability without loss of thermal stability, chemical resistance, tensile strength, or other desirable characteristics of such polymers.

It is an object of the invention to provide new and useful cross-linked polymers.

It is another object of the invention to provide a method of producing cross-linked polymers, particularly polymers containing nitroso groups in the main chain, and more particularly polymers containing substantial amounts of fluorine as well as nitroso groups.

Another object of the invention is to provide a method of cross-linking or vulcanizing polymers comprising monomeric units containing carboxylic acid groups.

Another object is to provide polymers cross-linked or vulcanized through carboxylic acid groups.

Various other objects and advantages of the present invention wil become apparent to those skilled in the art from the accompanying description and disclosure.

In accordance with the present invention, a polymer comprising monomeric units having carboxyl groups in side chains is reacted with a Werner-type complex forming chromium salt. More particularly a terpolymer comprising a perfluorinated nitroso alkane, a perfluorinated ethylenically unsaturated aliphatic monoolefin, and a perfluorinated nitroso carboxylic acid monomer is reacted with chromium triperfluoroacetate to form Werner-type chromium complexes with the carboxyl groups in the side chains of the polymer molecules, thus accomplishing cross-linking of the polymer molecules.

The carboxylic acid monomers employed are of types which will result ni carboxyl groups being incorporated in side chains in the polymer molecules. A type of polymer to which the invention is particularly advantageously applicable is represented by the following structural formula:

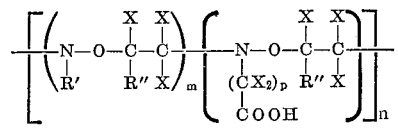

in which R' is a halogenated alkyl radical containing fluorine attached to the carbon atom adjacent to the nitroso group, in which the other halogens are selected from the group consisting of fluorine and chloride, and preferably the alkyl radical is perhalogenated and contains not more than six carbon atoms; R" is an alkyl group derived from the monoolefin, preferably containing not more than six carbon atoms, or is a halogen or hydrogen; X is fluorine or chlorine; $m$ is 0 to 500; $p$ is 1 to 9; and $n$ is generally 250 to 1,000. This type of polymer is prepared by interpolymerizing a nitroso alkane, an ethylenically unsaturated aliphatic monoolefin, and a nitroso carboxylic acid, preferably employing monomers which are more or less halogenated, and more particularly fluorinated. The details of polymerization are more particularly disclosed in copending application of George H. Crawford, Jr. and David E. Rice, Ser. No. 277,717, filed May 3, 1963, now U.S. Patent No. 3,321,454, the details of which are incorporated herein by reference.

Numerous other types of polymers prepared using carboxylic acid monomers as constituents thereof and having the carboxyl groups in side chains can be cured or vulcanized in accordance with this invention. The important consideration is that the carboxyl groups be free to coordinate with Werner-type complex forming chromium salts, such as chromium triperfluoroacetate and chromic acetate.

Now, having described the process of the invention in broad terms, it is more specifically illustrated by means of the following particular examples which serve to show the best modes presently contemplated of practicing the invention without thereby limiting the same. In the examples parts are by weight except where otherwise specified.

EXAMPLE I

Omega nitroso perfluorobutyric acid, trifluoronitrosomethane, and tetrafluoroethylene were charged into a Pyrex ampoule which was cooled to liquid nitrogen temperature during the charging of the second and third of the three reactants. The ratio of reactants charged was varied in different ampoules in accordance with the mole ratios shown in Table I. The ampoules were sealed, then warmed to −65° C., and shaken until a homogenous solution resulted. The ampoules were then held at −65° C. for 25 days. The resulting polymer in each ampoule was freed of unreacted monomer by drying under vacuum at 70° C.

TABLE I

| Ampoule No. | Monomers | Mole ratio | Percent conversion |
|---|---|---|---|
| 1 | HOOC CF$_2$CF$_2$CF$_2$NO | 0.7: | |
| | CF$_3$NO | 49.3: | 97 |
| | C$_2$F$_4$ | 50.0 | |
| 2 | HOOC CF$_2$CF$_2$CF$_2$NO | 0.5: | |
| | CF$_3$NO | 49.5: | 97 |
| | C$_2$F$_4$ | 50.0 | |
| 3 | HOOC CF$_2$CF$_2$CF$_2$NO | 1.0: | |
| | CF$_3$NO | 49.0: | 97 |
| | C$_2$F$_4$ | 50.0 | |
| 4 | HOOC CF$_2$CF$_2$CF$_2$NO | 0.25: | |
| | CF$_3$NO | 49.75: | 97 |
| | C$_2$F$_4$ | 50.0 | |

Polymers from ampoules 1 and 4 were cured by reacting them with chromium triperfluoroacetate in the proportions shown in Table II. Filler in the form of "Silstone 110," a silica-silicone oil type of filler manufactured by Stoner Rubber Co., was added in certain samples and milled into the polymers on a "Micro-Mill" rubber compounding mill in the proportions shown in Table II. The milled polymers with curing agent and filler incorporated therein were press cured for 1 hour at 200° F., then oven cured for 2 hours at 200° F., then oven cured for 2 hours at 220° F., then further oven cured for 2 hours at 250° F., then still further oven cured for 2 hours at 300° F. The sample to which no filler was added was similarly treated. The resulting polymers were subjected to physical testing and also to thermal stability testing, the results of which tests are given in Table II also.

TABLE II

| | Sample 1 (parts by wt.) | Sample 2 (parts by wt.) | Sample 3 (parts by wt.) |
|---|---|---|---|
| Elastomer: | | | |
| Ampoule 1, Table I | 100 | 100 | |
| Ampoule 4, Table I | | | 100 |
| Cr (CF$_3$COO)$_3$ | 8 | 8 | 8 |
| "Silstone 110" filler | 20 | | 20 |
| Original (unaged) properties: | | | |
| Tensile strength, p.s.i | 2,170 | 310 | 720 |
| Elongation, percent | 720 | 260 | 880 |
| Set at break, percent | 30 | 2 | 25 |
| Hardness, Shore A-2 | 57 | 38 | 43 |
| Low temperature properties (original, unaged samples): | | | |
| Gehman T$_{10}$, °C | −43 | −45 | −43 |
| Liquid oxygen temperature, impact resistance, ft./lb./in.$^2$ | 460 | 460 | 460 |
| Properties after aging 7 days at 300° F.: | | | |
| Weight loss, percent | 1.8 | 2.4 | 5.2 |
| Tensile strength, p.s.i | 2,070 | 325 | 1,520 |
| Elongation, percent | 700 | 230 | 720 |
| Set at break, percent | 40 | 0 | 24 |
| Hardness, Shore A-2 | 55 | 43 | 54 |
| Properties after aging 7 days at 350° F.: | | | |
| Weight loss, percent | 3.5 | 6.5 | 7.2 |
| Tensile strength, p.s.i | 1,600 | 380 | 1,640 |
| Elongation, percent | 560 | 280 | 630 |
| Set at break, percent | 26 | 0 | 20 |
| Hardness, Shore A-2 | 57 | 42 | 58 |
| Properties after aging 7 days at 400° F.: | | | |
| Weight loss, percent | 26.5 | 68.2 | 33.4 |
| Tensile strength, p.s.i | 1,340 | 270 | 1,160 |
| Elongation, percent | 370 | 140 | 380 |
| Set at break, percent | 14 | 0 | 18 |
| Hardness, Shore A-2 | 62 | 50 | 66 |

The chromium triperfluoroacetate employed as crosslinking reagent in this example was prepared as follows: 11.6 g. (0.073 mole) of chromic chloride (CrCl$_3$) was introduced into a 100 ml. flask. Trifluoroacetic acid (CF$_3$COOH) was added to the flask in the amount of 27.5 g. (0.22 mole+10% excess). The resulting mixture was refluxed while HCl vapors evolved. The temperature was raised to 125° C. and maintained until all evolution of HCl vapors ceased. The total heating time was about 24 hours. The mixture was permitted to stand overnight, then was reheated on a steam bath and exposed to a water-aspirator vacuum to remove any remaining HCl. The mixture was then subjected to a final vacuum treatment with a mechanical vacuum pump at room temperature. The product was a green solid, insoluble in water. A small sample dissolved in boiling nitric acid and tested with silver nitrate solution gave a negative chloride ion test.

EXAMPLE II

Example I was repeated except substituting trifluoromonochloroethylene for the tetrafluoroethylene employed in making the polyers of Example I. The polymers were vulcanized and filled polymer products exhibited properties closely similar to those of the polymers and vulcanized and filled polymer products of Example I.

EXAMPLE III

Example I was repeated except substituting chromic acetate for the chromium triperfluoroacetate employed in crosslinking the polymers of Example I. The vulcanized and filled polymer products exhibited properties closely similar to those of the vulcanized and filled polymer products of Example I. However, the processing in this case was somewhat more difficult since the compatibility of chromic acetate with fluorinated polymers is not as good as that of chromium triperfluoroacetate. Some foaming and scorching occurred during the milling operation with the chromic acetate. This can be reduced somewhat by employing a 10% aqueous solution of the chromic acetate, the water being evaporated during the milling operation.

Various other Werner-type complex forming chromium salts than those used in the above examples may be employed in practicing the present invention. For example, the propionate or the various halogen substituted propionates of trivalent chromium, chromic chloride or basic chromic chloride, or other salts of trivalent chromium with organic or inorganic acids may be employed. Werner complex formation and Werner complex forming chromium salts capable of forming coordination complexes are well-known in the art and, therefore, need not be discussed in detail here. Reference is made to U.S. Patent No. 2,273,040, U.S. Patent No. 2,356,161 and U.S. Patent No. 2,524,803 for discussions of Werner complex forming chromium salts and Werner complex formation.

The present invention is not limited to the specific polymers disclosed in the foregoing examples. Numerous copolymers containing monomeric units having sidechains with free carboxyl groups that are not involved in forming the main chain of the polymer can be cross-linked or vulcanized in accordance with the invention. When a nitroso group is employed as the functional group for incorporating a monomer containing carboxyl groups in the polymer chain, the monomeric unit containing the nitroso group is preferably saturated in the carbon chain and the nitroso group is preferably attached to the omega carbon atom. The manner in which the carboxyl-containing monomer is linked in the polymer chain is of little consequence so long as the carboxyl groups are free to coordinate with the chromium atoms of the Werner complex forming chromium salt employed. For example, CF$_2$=CFCOOH, CF$_2$=CFCF$_2$COOH, and

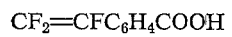
CF$_2$=CFC$_6$H$_4$COOH can be employed. Other unsaturated carboxylic acid monomers, either with or without halogen atoms substituted in the chain, or with other substituent atoms or groups may also be employed. Acrylic acid, methacrylic acid, and various other polymerizable unsubstituted and unsaturated carboxylic acids may be employed for introducing carboxyl groups in the sidechains of polymers to which the invention is applicable.

Generally speaking, it is preferred that the monomeric units containing carboxylic acid groups be present in the polymer to the extent of not more than approximately five mole percent in order to avoid excessive crosslinking and consequently excessive hardening of the polymer. Even minute quantities of the monomeric units containing carboxylic acid groups will prove beneficial, but it is preferred to have at least one-tenth mole percent present in the polymer.

The vulcanized polymers prepared in accordance with the present invention have a distinct advantage over the same types of polymers vulcanized with oxides or hydroxides of divalent metals in that the former exhibit low compression set characteristics, whereas the polymers vulcanized with oxide or hydroxides of divalent metals exhibit very high compression set characteristics. Furthermore, the vulcanized polymers of the present invention have a distinct advantage over the same types of polymers vulcanized with amines in that they show good thermal stability and good chemical resistance, whereas the corresponding polymers vulcanized with amines show poor thermal stability and poor chemical resistance.

The vulcanized polymers of the present invention are useful as coatings, sealants, gaskets, O-rings, and in numerous other articles, especially where a vulcanized rubbery type of article is to be used at extremely low temperatures or at relatively high temperatures or in contact with chemical agents which are destructive to other rubbery types of materials.

Various modifications of the described procedure as well as changes in ratios of the reactants and other reaction conditions may be utilized to effect the cross-linking reaction without departing from the scope of this invention as defined in the appended claims.

I claim:

1. The method of curing a polymer represented by the following structural formula:

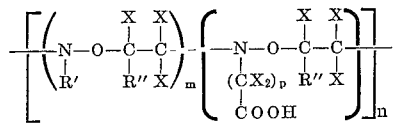

in which R' is a halogenated alkyl radical containing fluorine attached to the carbon atom adjacent to the nitroso group and in which the other halogens are selected from the group consisting of fluorine and chlorine; R" is selected from the group consisting of an alkyl group, a halogen, and hydrogen; X is selected from the group consisting of fluorine and chlorine; $m$ is 0 to 500; $p$ is 1 to 9; and $n$ is from about 250 to about 1000; by reacting said polymer with a compound selected from the group consisting of chromium triperfluoroacetate and chromic acetate.

2. The method of curing a polymer in accordance with claim 1 wherein said polymer comprises omega nitroso perfluorobutyric acid monomeric units.

3. The method of curing a polymer in accordance with claim 1 wherein said polymer comprises as monomeric units thereof a nitroso alkane, an ethylenically unsaturated aliphatic monoolefin, and a carboxylic acid selected from the group consisting of saturated omega nitroso carboxylic acids and unsaturated carboxylic acids, said carboxylic acid being present in said polymer to the extent of from about 0.1 mol percent to about 5.0 mol percent thereof.

4. The method of curing a polymer in accordance with claim 1 wherein said polymer comprises as monomeric units thereof about 0.7 mol percent of omega nitroso perfluorobutyric acid, about 49.3 mol percent of trifluoronitrosomethane, and about 50 mol percent of tetrafluoroethylene.

5. A polymer represented by the following structural formula:

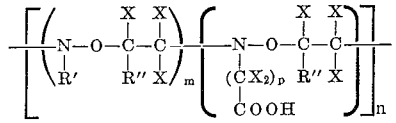

in which R' is a halogenated alkyl radical containing fluorine attached to the carbon atom adjacent to the nitroso group and in which the other halogens are selected from the group consisting of fluorine and chlorine; R" is selected from the group consisting of an alkyl group, a halogen, and hydrogen; X is selected from the group consisting of fluorine and chlorine; $m$ is 0 to 500; $p$ is 1 to 9; and $n$ is from about 250 to about 1000; crosslinked through the pendant carboxyl groups with a compound selected from the group consisting of chromium triperfluoroacetate an dchromic acetate.

6. A polymer in accordance with claim 5 wherein said polymer comprises omega nitroso perfluorobutyric acid monomeric units.

7. A polymer in accordance with claim 5 wherein said polymer comprises omega nitroso perfluoro-butyric acid; trifluoronitrosomethane, and tetrafluoroethylene units.

8. A polymer in accordance with claim 5 wherein said polymer comprises omega nitroso perfluorobutyric acid, trifluoronitrosomethane, and trifluoromonochloroethylene monomeric units.

9. A oplymer in accordance with claim 5 wherein said polymer comprises as monomeric units thereof a nitroso alkane, an ethylenically unsaturated aliphatic monoolefin, and a carboxylic acid selected from the group consisting of saturated omega nitroso carboxylic acids and unsaturated carboxylic acids, said carboxylic acid being present in said polymer to the extent of from about 0.1 mol percent to about 5.0 mol percent thereof.

10. A polymer in accordance with claim 5 wherein said polymer comprises as monomeric units thereof about 0.7 mol percent of omega nitroso perfluorobutyric acid, about 49.3 mol percent of trifluoronitrosomethane, and about 50 mol percent of tetrafluoroethylene.

References Cited

UNITED STATES PATENTS

| | | | |
|---|---|---|---|
| 2,524,803 | 10/1950 | Iler | 260—80.3 |
| 3,245,968 | 4/1966 | Dipner | 260—92.1 |

JOSEPH L. SCHOFER, *Primary Examiner.*

J. A. DONAHUE, *Assistant Examiner.*